US00RE35199E

United States Patent [19]

Gervais

[11] E Patent Number: Re. 35,199

[45] Reissued Date of Patent: Apr. 2, 1996

[54] AIR VENT CLOSURE SYSTEM

[76] Inventor: Hubert Gervais, 29 Port Neuf, Cantley, Quebec, Canada, J8V 3J1

[21] Appl. No.: 183,755

[22] Filed: Jan. 21, 1994

Related U.S. Patent Documents

Reissue of:

[64] Patent No.: 5,081,913
Issued: Jan. 21, 1992
Appl. No.: 525,028
Filed: May 18, 1990

[51] Int. Cl.[6] ..... F04D 25/14; F16K 31/12

[52] U.S. Cl. ..... 454/343; 137/486; 454/340; 454/359

[58] Field of Search ..... 454/343, 340, 454/359; 137/486

[56] References Cited

U.S. PATENT DOCUMENTS

| | | | |
|---|---|---|---|
| 2,383,003 | 8/1945 | Mader | 98/116 |
| 2,750,868 | 6/1956 | Mieczkowski et al. | 98/116 |
| 2,938,536 | 5/1960 | Ehrenberg | 137/487.5 |
| 4,334,648 | 6/1982 | Buth et al. | 137/486 X |
| 4,375,224 | 3/1983 | Noll | 137/486 |
| 4,624,280 | 11/1986 | De Pirro | 137/487.5 X |
| 4,665,932 | 5/1987 | Quenin | 137/486 |
| 4,671,318 | 6/1987 | Benson | 137/486 |
| 4,796,651 | 1/1989 | Ginn et al. | 136/487.5 |

FOREIGN PATENT DOCUMENTS

| | | | |
|---|---|---|---|
| 1213250 | 7/1960 | Germany | 98/119 |

*Primary Examiner*—Henry A. Bennet
*Assistant Examiner*—William C. Doerrler
*Attorney, Agent, or Firm*—David J. French

[57] ABSTRACT

An automatic ventilator closure is described which operates on the basis of an over-pressure within the conduit leading up to the ventilator outlet. Electrical interlocks control a motor to place the closure in an open or closed condition.

11 Claims, 4 Drawing Sheets

AIR VENT CLOSURE SYSTEM

Matter enclosed in heavy brackets [ ] appears in the original patent but forms no part of this reissue specification; matter printed in italics indicates the additions made by reissue.

FIELD OF THE INVENTION

This invention relates to the automatic opening and closing of air vent outlets. More particularly, it relates to the detection of an over-pressure condition in an exhaust outlet in order to activate the opening of a door or flap.

BACKGROUND OF THE INVENTION

Many buildings are provided with exhaust vents to evacuate air from the interior of the building to out-of-doors. Typical examples include exhaust vents for residential driers and stoves.

When the ventilation system operates intermittently, if the exhaust outlet is left in an open condition, a back-draft condition may occur. In cold climates, cold air may enter the structure, causing discomfort, condensation and heat loss.

It would, therefore, be desirable to provide an automatic mechanism for opening and closing an air exhaust outlet, according to whether or not air is being exhausted or ventilated therethrough.

A variety of prior art references have addressed this problem. Some have relied directly on activation of the closure system by the direct means of the physical force that the over-pressure develops when the exhaust fan is turned on. Others have relied on a powered opening mechanism that is coupled directly to the ventilation system's fan or motor. In such cases, the opening mechanism is operated by an electrical switch that is activated by the electrical circuit that turns the fan motor on. Examples in the former category of direct, pressure activated systems are:

U.S. Pat. No. 2,730,943 R. B. Klein

U.S. Pat. No. 2,739,521 W. A. Spear

U.S. Pat. No. 3,541,945 Monroe L. Wexler

U.S. Pat. No. 4,214,380 Stephen T. Meyer

U.S. Pat. No. 4,237,621 Lucien Boismenu

The use of direct mechanical force derived from an over-pressure condition is deficient in that the weight of the closure means, generally a flap or segmented vanes, must be kept to a minimum. This, in turn, limits the amount of closing force that such closure means may exert. Further, variations in the degree of over-pressure, as when temporary blockages or diversions of air occur within the conduit, may cause the closure means to oscillate, and produce noise.

As mentioned above, it is also known to activate the opening and closing of doors by electric actuators in accordance with the activation of the fan motor. This arrangement has the disadvantage of requiring that an electrical connection from the ventilator fan motor to the ventilator outlet be installed.

However, a combined mechanism for conveniently detecting a draft/no-draft condition in an air exhaust outlet, and activating a closure for such a ventilator outlet in a positive fashion without being electrically or mechanically connected to the ventilator fan has not been proposed.

It is, therefore, an object of this invention to provide such a mechanism.

SUMMARY OF THE INVENTION

According to the invention a closure means on an outlet for a forced air exhaust conduit is activated between an open condition when air is being exhausted, and a closed condition when air is not being exhausted, by means of the combination of:

(1) an actuating motor means for positioning said closure in either a closed or open state; and (2) switch means for activating said motor to position said closure in either said open or closed state wherein said switch means is responsive to an over-pressure, or absence of over-pressure condition in said conduit with respect to ambient pressure external to said conduit.

By a further feature of the invention said switch means is also responsive to an air flow in said conduit, or absence of an air flow in said conduit.

More particularly, the aforesaid switch means may, in a preferred embodiment, comprise:

(1) a source of electrical current for said actuating motor means;

(b 2) electrical switch means capable of switching said current to said motor means between "on" or "off" conditions;

(3) an over-pressure sensor system connected to activate said switch and comprising:

(a) a bleed-outlet formed in said conduit through which air may tend to escape when said over-pressure condition exists; and (b) a pressure-sensing means positioned to move between a first, over-pressure detecting position under the influence of an over-pressure to close said bleed-outlet and a second, no-pressure detecting position in the absence of an over-pressure where said bleed outlet is not closed.

whereby said electrical switch is activated by said pressure sensing means to control said motor means.

By a further feature of the invention said electrical switch means is also activated by an air flow sensing means positioned to detect the presence or absence of an air flow condition in said conduit.

By a further feature of the invention, first electrical interlock and switching means is provided to interrupt the flow of current to said motor when said closure means is in a fully open position, simultaneously with said pressure sensing means being at said over-pressure or air flow detecting position; and to permit the flow of current to said motor, so as to effect closure of said conduit, when said pressure sensing means indicate said no-pressure condition.

In the preferred embodiments a bleed-outlet with an inner swinging flap which is positioned to swing under an over-pressure condition towards said bleed outlet is used as the pressure sensing device to activate the switch.

By a further feature of the invention, the said bleed-outlet may be formed in said region of said conduit exterior to said closed structure from which said exhaust air originates.

By a further feature of the invention, a sealing means may be provided which is positioned to close said bleed-outlet when an over-pressure condition does not exist.

By a further feature of the invention the pressure sensing means, motor means and closure may be combined in a modular unit that may attached directly to the conduit outlet without further wiring.

Thus, in accordance with the invention and with further features described below, when an exhaust fan turns on and creates an over-pressure in the air exhaust conduit, the pressure sensing means will be activated. In the preferred embodiment, it will move to a first position so as to close the bleed outlet, activating a first switch which supplies current to the motor means. The motor means, which may be a stepping motor or standard dc electrical motor acting through a reduction drive or other arrangement of similar effect, will then open the conduit closure. Once the closure is fully open, the interlock means interrupts the flow of current to the motor and holds the conduit closure in a static, "open" mode.

With the closure fully open the over-pressure condition in the conduit will reduce and may cause a faulty detection of the requirement to have said closure in the fully open position. It is for this reason that the pressure sensing means may be combined with an air flow sensing means so as to keep the said first switch in the static, open mode if air flow is detected with only a minimal over-pressure condition.

When the exhaust fan stops, the over-pressure condition in the conduit will drop and the air flow will stop. This causes the pressure/air flow sensing means to be deactivated. In the preferred embodiment the pressure-sensing means will move, under a spring or gravity bias, to a second position whereby the bleed outlet is open. By this action the electrical interlock holding the conduit closure in its "open" state is over-ridden and a second switching means commences to provide current to the motor in a manner which causes the closure means for the conduit to close.

A second interlock means may be provided to interrupt the flow of current to the motor, once the closure means on the conduit is in a fully closing condition. This second interlock may be over-ridden and combined with the first switch means to permit current to flow to the motor means, in a closure-opening direction, once the pressure-sensing means is moved by a resumption of over-pressure to its first closure-opening position.

An outer sealing means may be provided for the pressure sensor in the form of a flap that does not interfere with the movement of the pressure sensing means between its first and second positions. However, when the pressure sensing means is fully at its second position this sealing means then covers the bleed outlet. Such an arrangement is easily provided by utilizing an interiorly located flap for the pressure sensing means and coupling the inner flap in a symmetrical fashion to an exterior flap which serves as the sealing means. By coupling these two flaps so that they move in unison, each will take turns closing the bleed outlet without interfering with the ability of the pressure sensing means to move between its first and second positions.

These and further features of the invention will be better understood from the description of the preferred embodiments which now follows.

SUMMARY OF THE PREFERRED EMBODIMENTS

Figure 1:
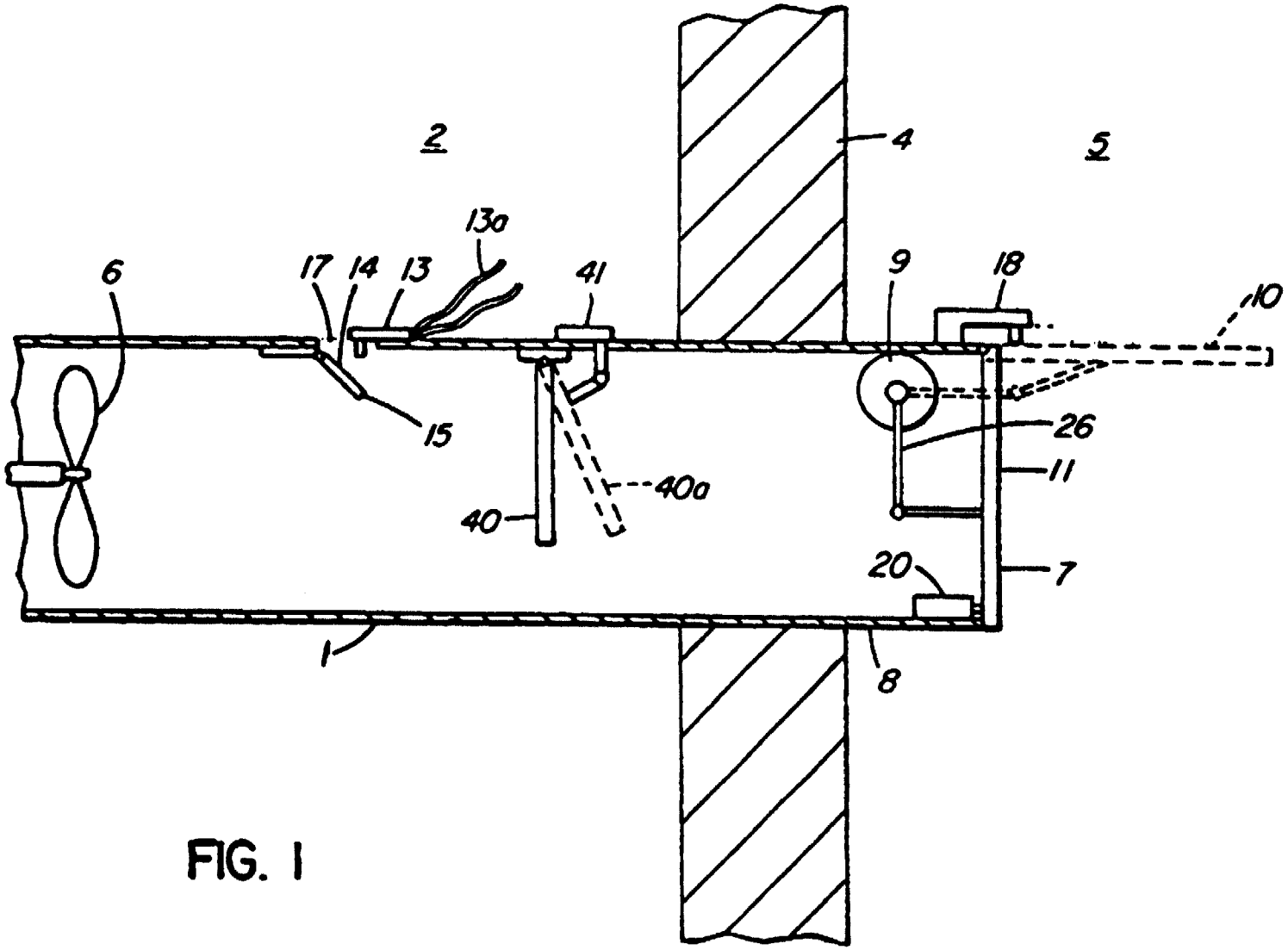
FIG. 1 is a schematic drawing of a conduit passing through the wall of a structure where it terminates in a motor controlled closure.

In FIG. 1 a conduit (1) passes from the interior (2) of a structure through a wall (4) to the exterior (5). A source of air, such as a fan (6), intermittently supplies air, under pressure, to the conduit (1).

A closure (7) in the form of a cover is positioned at the exterior end (8) of the conduit (1) as it exits the wall (4). The closure (7) may either be in the form of a swinging door, or a series of rotatable slats. A motor (9) is positioned to rotate the closure (7) between open (10) and closed (11) positions through hinged linkage (26).

Current for the motor (9) is provided from a power source (not shown in FIG. (1)), which may be a battery, through wires leading to a first pressure sensing switch (13).

Figure 2A:
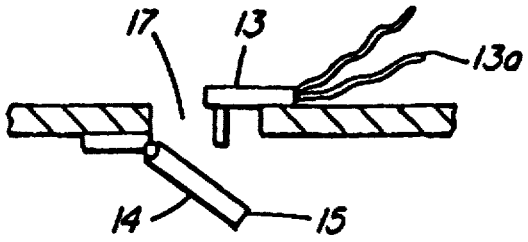
FIG. 2a and 2b show one form of pressure sensor, in open and closed conditions.
Figure 2B:
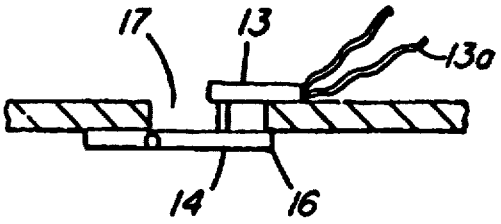

The pressure sensing switch may be a piezo electric device, or other standard, commercial pressure sensor, such as one of the Motorola (™) series pressure sensor transducers sold under the MPX-trade mark. Alternately, the pressure sensing switch (13), conveniently may be in the form of a position-sensitive mercury or mechanical contact switch that is mounted in a fixed position with respect to a swinging vane (14) that is a component of the pressure sensing system. This is the configuration shown in greater detail in FIGS. 2a and 2b.

The vane (14) can move between open (15) and closed (16) positions. In the open position (15) a bleed-outlet (17) through the conduit (1) may be exposed. In the closed position (16), this bleed-outlet (17) is covered by the vane (14) which functions as a flap.

The switch (13), which may be of the double pole-double thrown type, or may operate a relay allows current to flow to the motor (9) when the vane (14) is at open position (15) and the closure (1) is at closed position (11). Current is then supplied through wires (13a) in a direction that causes the closure (1) to open.

An alternative pressure sensing switch may be utilized that relies on a single pole optical detector and relay switch. Such optical detector is positioned to activate the relay switch in accordance with whether the vane (14) is in its open (15) or closed (16) positions, and the relay switch provides the function of operating the motor.

A first interlock switch (18), conveniently in the form of a contact switch, detects when the closure (1) is in the open position (10). It then interrupts current to the motor (9), thus serving as an electrical interlock. Subsequently, this first interlock switch (18) is bypassed by a closure-activating switch (19), described further below.

Friction in the motor drive, conveniently supports the closure (7) in the open position (15), once the fully opened position is reached.

As long as the fan (6) continues to provide air to the conduit (1), the over-pressure created will hold the vane (14) in position (16) where it closes the bleed-outlet (17). In cases where the air flow is so low as to cause uncertainty in the operation of the pressure sensing switch, reliability may be increased by providing a switching vane (40) which is suspended in the path of the air flow, and which activates in parallel a supplementary switch (41) to the pressure sensing switch (13) when it swings under the influence of air flow to a position 40a.

When the fan (6) shuts down, the over-pressure and air flow condition will disappear. The vane (14) is biased by its own weight, or a spring, to fall away from the bleed-outlet (17). Once in its second or open position (15) the second pole of the pressure sensing switch (13) is activated to provided current to the motor (9) through wires bypassing the first electrical interlock switch (18). The closure-effecting poles of the pressure sensing switch (13) operate in complementary fashion. Each pole routes current to the motor (9) so as to correspondingly rotate the closure (7) between the open (10) and closed positions (11).

Thus the motor (9) is fed current supplied, for example, by battery (25), through the closure activating pole of the pressure sensing switch (13) in a direction that causes the closure (7) to move to its closed position (11). On arriving at this closed position (11), a second further electrical interlock switch (20) interrupts the flow of current to the motor (9). The pressure sensing switch (13) is wired to the motor (9) in a manner whereby the second electrical interlock switch (20) is bypassed when the vane (14) returns to the closed position (17).

The logic of this switching is shown in Table (1).

TABLE 1

| | Bleed-Outlet Open | Bleed-Outlet Closed |
|---|---|---|
| Closure Open | SS1 = 0<br>SS2 = 1<br>IS1 = 0<br>IS2 = 1<br>(Motor on, in closing direction) | SS1 = 1<br>SS2 = 0<br>IS1 = 0<br>IS2 = 1<br>(Motor off) |
| Closure Closed | SS1 = 0<br>SS2 = 1<br>IS1 = 1<br>IS2 = 0<br>(Motor Off) | SS1 = 1<br>SS2 = 0<br>IS1 = 1<br>IS2 = 0<br>(Motor on, in opening direction) |

where the above parameters have the following definitions.
SS1 — is the first or "opening" pole of the pressure sensing switch
SS2 — is the second or "closing" pole of the pressure sensing switch effecting, switch
IS1 — is the first interlock switch in its initial state*
IS2 — is the second interlock switch in its initial state
"0" represents an open condition
"1" represents a closed or "on" condition
*The initial state of the interlock switches are indicated because both such switches are "on" transmission.

Figure 5:
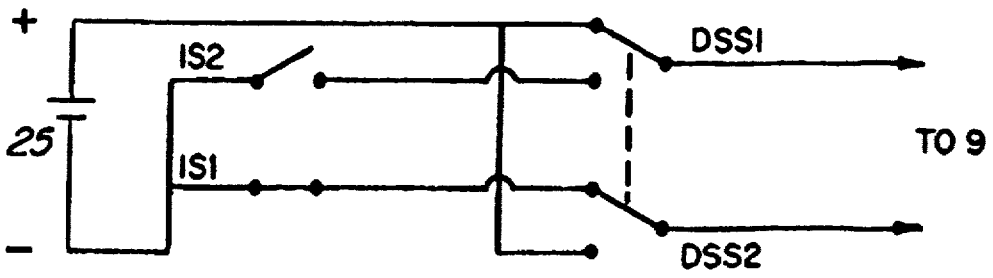
FIG. 5 is an electrical schematic for a circuit to activate the closure of an alternate linkage arrangement between the motor and closure.

An electrical circuit which will carry-out these functions is shown in FIG. 5. This circuit is shown in the transition state to effect opening.

In FIG. 5 a source of dc current (25) provides current to a dc motor (9). IS1 and IS2 are single pole switches which correspond to the first and second interlock switches. DSS1 and DSS2 are double pole switches by which in one position there will be a flow of current to the motor (9) in one direction and in the other position there will be a flow of current to the motor (9) in the opposite direction. The double pole functions of the switches DSS1 and DSS2 correspond to the first and second sensing switches, with the added feature of providing a reversing routing for the current to the motor. This double pole-double throw function may be effected through the use of a single pole switch as a single sensing switch, and a correspondingly controlled relay.

Figure 3A:
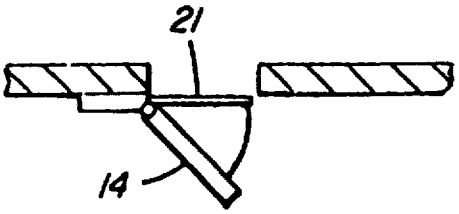
FIG. 3a and 3b shown an alternate form of pressure sensor, in open and closed conditions.
Figure 3B:
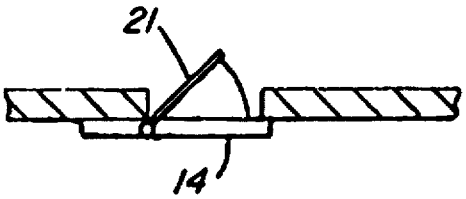
Figure 4A:
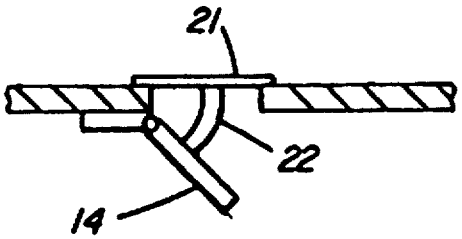
FIGS. 4a and 4b show a further pressure sensor with a supplementary cover for the bleed outlet in the form of an external flap.
Figure 4B:
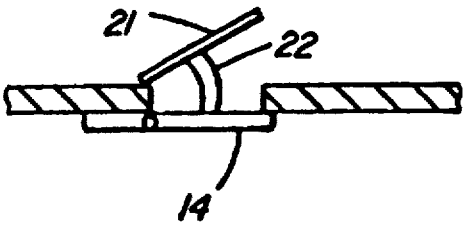

As an optional feature, for the mechanical arrangement of the preferred pressure sensing embodiment, the vane (14) may be provided with a complementary outlet-occupying block (21) mounted to swing with the vane (14) as shown in FIGS. 3a, b. This block will enhance the pressure sensitivity of the vane (14) and provide means to close the bleed-outlet from entry by insects.

As a further alternative, the vane (14) may be coupled to an external flap (21) by a spacing strut (22). When the vane (14) is in its open position (15), the flap (21) is positioned to cover the bleed-outlet (17). This will also prevent entry of insects and cold air through the bleed outlet (17).

The flap (21) is particularly desirable when the bleed-outlet is positioned exterior to the wall (4). However, the bleed outlet (17) may be placed within the interior (2) of the structure. In such case, the need for the flap (21) is not as pressing.

Figure 6:
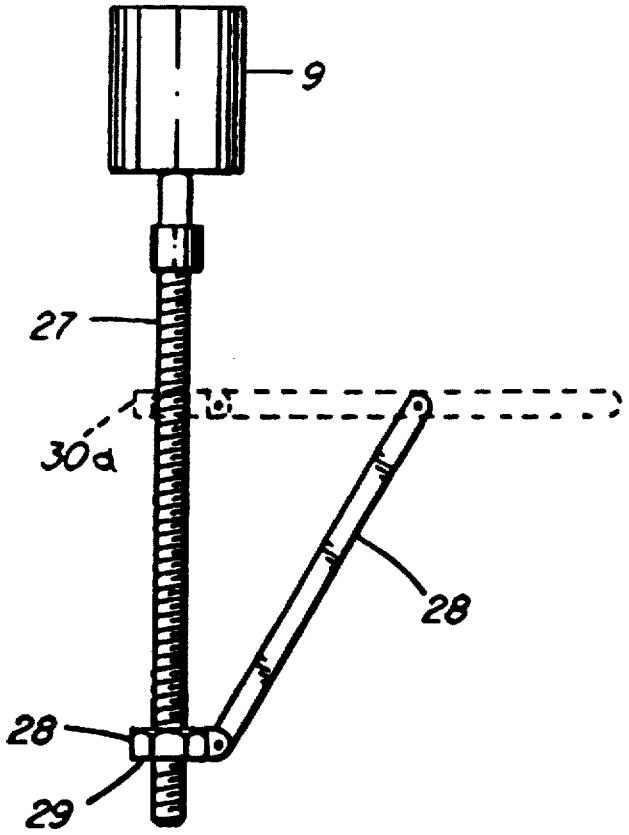
FIG. 6 is a schematic depiction of an alternate linkage arrangement between the motor and closure.
Figure 7:
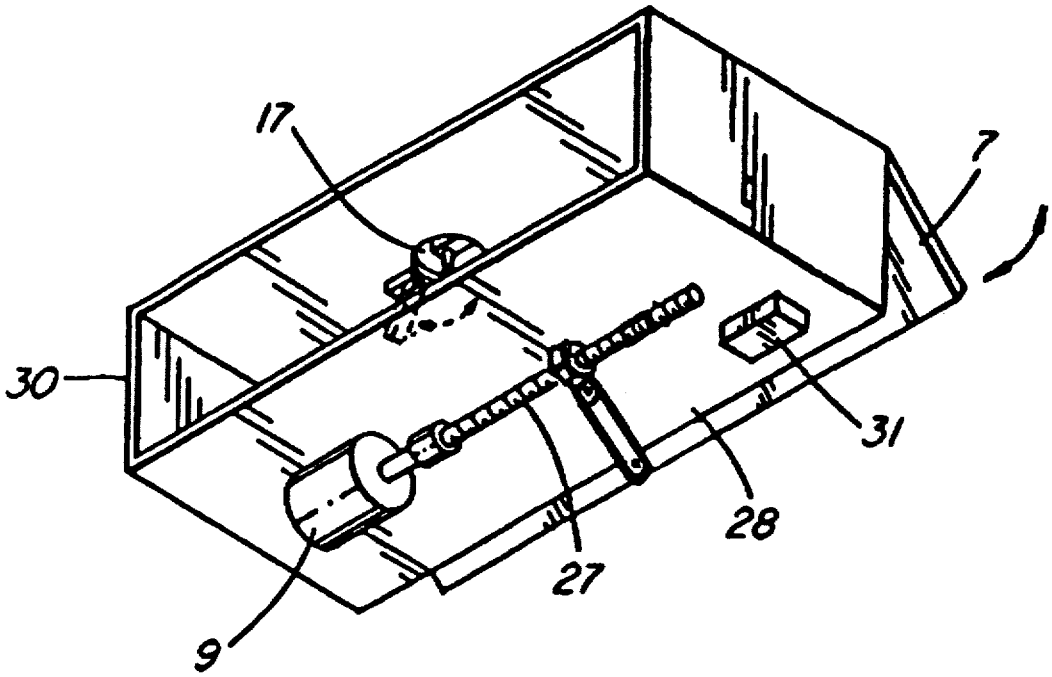
FIG. 7 is an isometric view of an externally mountable closure module which may be installed as an add-on to existing ventilation outlets.

As an alternative arrangement for coupling the motor (9) to the closure (7) as shown in FIG. 6, the motor (9) may be mounted beneath a rectangular sleeve 30 which fits on the end of the conduit 1, as shown in FIG. 7. As shown in FIGS. 6 and 7 the motor (9) may be provided with a threaded shaft (27). A thread nut (28) mounted on the shaft (27) is flexibly coupled to a linkage (28) which is flexibly coupled to the bottom of the closure (7). Initially in a position (29) corresponding to the closure (7) being in its closed position the nut (28) is moved by rotation of the shaft (27) to a position (30a). This change in position causes the linkage (28) to extend outwardly, opening the closure (7) as in FIG. 7 (not shown in FIG. 6). Such a motor-linkage arrangement can conveniently be mounted beneath the conduit (1) adjacent the closure (7).

FIG. 7 shows a modular form of the invention adapted for external attachment to existing exhaust fan outlets where the conduit (1) exits through a wall (4). In this embodiment a sleeve (30) is provided to fit on a close friction basis with the end of the conduit (1) (not shown). This sleeve (30) carries the bleed-outlet (17) at a convenient position. This may be at the top (as shown) where gravity is to bias the sensing vane to assume an open condition when no over-pressure exists. Alternately, it may be located elsewhere when a spring-biasing means is provided.

The closure 7, in the form of a hinged flap, is opened and closed by a transversely mounted motor (9) with threaded shaft (27) and linkage (28), as described above. The motor (9) is mounted beneath the sleeve (30) in order to shelter it. As well, a battery and relay module (31) may be similarly mounted.

Figure 8:
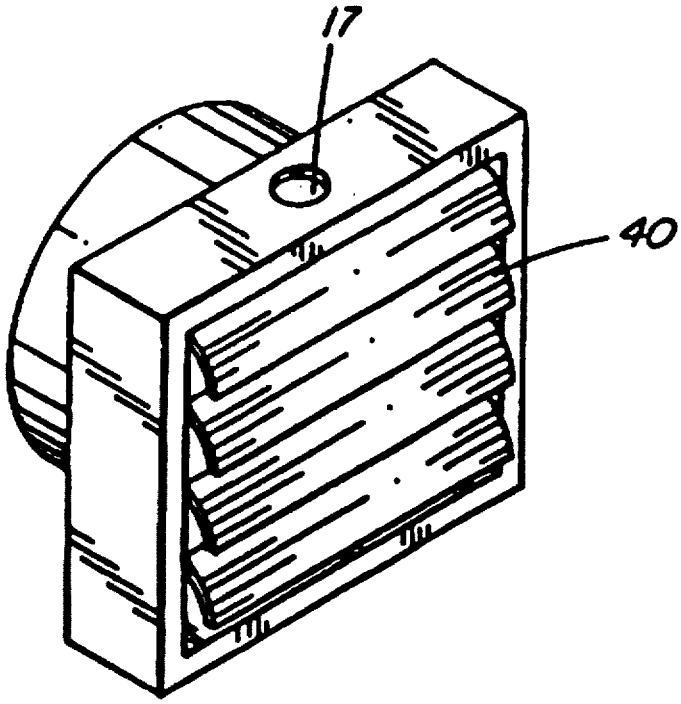
FIG. 8 is a further isometric view of an alternate form of slatted module.

An alternate louvered modular unit, shown in FIG. 8, may be readily fitted in place by consumers with a minimum of effort, on a complementary circular conduit. The interior region behind the louvers (40) in this embodiment will provide the required space for the motor and necessary linkages.

From the foregoing it will be seen that an automatic closure mechanism can be provided for an air exhaust outlet, in accordance with the principles exemplified by the preferred embodiments, which is independently capable of opening and closing, according to whether there is an exhaust draft or not. Such a unit in modular format may be conveniently installed by consumers as an " after-fitted" feature to clothes driers, stoves and oven exhausts. Once installed, it will provide protection from the discomfort and energy costs of exterior air infiltration when the exhaust fan is no longer operating.

The foregoing has been a description of preferred, exemplary embodiments. The invention in its most general and more particular aspects is further described and defined in the claims which now follow.

The embodiments of the invention in which an exclusive property is claimed as follows:

1. A closure means on an outlet for a forced air exhaust conduit which is positioned to convey air from within a closed structure to a region exterior to such structure, comprising:

(1) an actuating motor means for positioning said closure in either a closed or open state in response to electrical current provided by an electrical source;

(2) electrical switch means for providing said motor with said electrical current;

(3) an over-pressure sensor system responsive to an over-pressure condition in said conduit with respect to ambient pressure external to said conduit and connected to activate said switch, [such sensor system comprising:

(a) a bleed-outlet formed in said conduit through which air tends to escape when said over-pressure condition exists; and (b) a pressure-sensing means positioned to swing between a first, over-pressure detecting position closing said bleed-outlet, and a second, no-pressure detecting position where said bleed-outlet is not closed]*; and*

*(4) an air flow sensing means which is positioned to detect the presence or absence of air flow within said conduit,* wherein said electrical switch is activated by said [pressure sensing means] *over-pressure sensor system and by said air flow sensing means in parallel* to control said motor means *to open said closure in the presence of either airflow or an over-pressure condition and to close said closure in the absence of both air flow and an over-pressure condition.*

2. A closure means as in claim 1 wherein said [electrical switch means is also activated in parallel by an air flow sensing means which is positioned to detect the presence or absence of air flow within said conduit] *over-pressure sensor system comprises:*

*(a) a bleed-outlet formed in said conduit through which air tends to escape when said over-pressure condition exists; and*

*(b) a pressure-sensing means positioned to swing between a first over-pressure detecting position closing said bleed-outlet, and a second, non-pressure detecting position where said bleed-outlet is not closed.*

3. A closure means as in claim 1 or 2 wherein first electrical interlock and switching means is provided to interrupt the flow of current to said motor when said closure means is in a fully open position, and to permit the flow of current to said motor, in a direction so as to effect closure of said conduit, when said pressure sensing means is at said no-pressure position.

4. A closure as in claim 3 wherein a second interlock and switching means is provided to interrupt the flow of current to said motor, once the closure means on the conduit is in a fully closed condition, and to permit current to flow to said motor means, in a closure-opening direction, once the pressure-sensing means is activated by an over-pressure condition in said conduit.

5. A closure means as in claim [1 or] 2 wherein a secondary bleed-outlet closure means is provided which is positioned to close said bleed-outlet when an over-pressure condition does not exist within said conduit.

6. A closure means as in claim 4 wherein a secondary bleed-outlet closure means is provided which is positioned to close said bleed-outlet when an over-pressure condition does not exist within said conduit.

7. A closure as in claims 1 or 2 in the form of a modular unit incorporating a battery as said electrical source that may be fitted at the exiting end of said [closure] *conduit.*

8. A closure as in claim 3 in the form of a modular unit, incorporating a battery as said electrical source, that may be fitted at the exiting end of said [closure] *conduit.*

9. A closure as in claim 4 in the form of a modular unit, incorporating a battery as said electrical source, that may be fitted at the exiting end of said [closure] *conduit.*

10. A closure as in claim 5 in the form of a modular unit, incorporating a battery as said electrical source, that may be fitted at the exiting end of said [closure] *conduit.*

11. A closure as in claim 6 in the form of a modular unit, incorporating a battery as said electrical source, that may be fitted at the exiting end of said [closure] *conduit.*

* * * * *